(12) United States Patent
Yarlagadda

(10) Patent No.: US 6,580,786 B1
(45) Date of Patent: Jun. 17, 2003

(54) MESSAGE STORE ARCHITECTURE

(75) Inventor: Madhu Yarlagadda, San Jose, CA (US)

(73) Assignee: Yahoo! Inc., Santa Clara, CA (US)

( * ) Notice: Subject to any disclaimer, the term of this patent is extended or adjusted under 35 U.S.C. 154(b) by 0 days.

(21) Appl. No.: 09/659,233

(22) Filed: Sep. 11, 2000

(51) Int. Cl.$^7$ .............................................. H04M 1/64
(52) U.S. Cl. ............................... 379/88.17; 379/88.18; 379/88.22
(58) Field of Search .......................... 379/67.1, 88.08, 379/88.09, 88.13, 88.17, 88.18, 88.22, 90.01, 201.01, 201.02, 201.12; 709/201, 212, 217, 218, 219, 10, 200

(56) References Cited

U.S. PATENT DOCUMENTS

| | | | |
|---|---|---|---|
| 5,333,266 A | * 7/1994 | Boaz et al. .................. 395/200 |
| 5,497,373 A | 3/1996 | Hulen et al. |
| 5,592,480 A | 1/1997 | Carney et al. |
| 5,647,002 A | * 7/1997 | Brunson ................ 379/67.1 X |
| 5,809,128 A | 9/1998 | McMullin |
| 5,872,926 A | * 2/1999 | Levac et al. ........... 395/200.36 |
| 5,884,262 A | 3/1999 | Wise et al. |
| 5,951,638 A | * 9/1999 | Hoss et al. ................. 709/206 |
| 6,055,240 A | * 4/2000 | Tunnicliffe .................. 370/428 |
| 6,061,347 A | 5/2000 | Hollatz et al. |
| 6,078,886 A | 6/2000 | Dragosh et al. |
| 6,137,864 A | * 10/2000 | Yaker ....................... 379/88.22 |
| 6,144,667 A | 11/2000 | Doshi et al. |
| 6,175,858 B1 | * 1/2001 | Bulfer et al. ................. 709/206 |
| 6,181,781 B1 | * 1/2001 | Porter et al. .............. 379/88.17 |
| 6,185,565 B1 | * 2/2001 | Meubus et al. ................ 707/10 |
| 6,230,190 B1 | * 5/2001 | Edmonds et al. ........... 709/213 |
| 6,233,318 B1 | * 5/2001 | Picard et al. ............. 379/88.17 |
| 6,240,448 B1 | * 5/2001 | Imielinski et al. .......... 709/218 |
| 6,246,758 B1 | 6/2001 | Low et al. |
| 6,269,095 B1 | 7/2001 | Neubauer et al. |
| 6,269,336 B1 | 7/2001 | Ladd et al. |
| 6,282,192 B1 | 8/2001 | Murphy et al. |
| 6,282,270 B1 | * 8/2001 | Porter ...................... 379/88.17 |
| 6,292,480 B1 | 9/2001 | May |
| 6,301,245 B1 | * 10/2001 | Luzeski et al. ............. 370/352 |
| 6,404,762 B1 | * 6/2002 | Luzeski et al. ............. 370/352 |
| 2001/0030958 A1 | 10/2001 | Kichise |
| 2001/0048676 A1 | * 12/2001 | Jimenez et al. ............. 370/352 |
| 2002/0006124 A1 | * 1/2002 | Jimenez et al. ............. 370/352 |

* cited by examiner

Primary Examiner—Scott L. Weaver
(74) Attorney, Agent, or Firm—Townsend, Townsend & Crew LLP

(57) ABSTRACT

A unified, intelligent message store is scalable and is optimized to provide both streaming and non-streaming data, as required, to telephony and web-based applications. A message application server (MAS) includes an expandable number of message pools, each message pool having message blocks that can be linked to store variable length messages. Multiple MASs can be used to extend the system.

10 Claims, 12 Drawing Sheets

MESSAGE STORE ARCHITECTURE

CROSS-REFERENCES TO RELATED APPLICATIONS

This application is related to and claims the benefit of applications No. 09/658,771, entitled "Voice Integrated VOIP System" No. 09/658,781, entitled "Intelligent Voice Bridging" and No. 09/658,802, entitled "Intelligent Voice Converter", all filed Sep. 11, 2000, the disclosures of which are incorporated herein by reference.

BACKGROUND OF THE INVENTION

Data storage devices/servers that are capable of storing messages are known. However, most of these devices are not optimized for storing messages. A message store contains user preferences, message directories, and a list of individual messages that may vary in size and content. Traditional message stores tend to use multiple files to keep track of, these different types of information. They all use one file to keep track of the user preferences, another to hold the message directory information, and a set of individual files that store each user message. In such a system, a single user having 20 messages will require a total of 22 files, 20 for the individual messages, one to keep track of the message directory, and yet another to keep track of the user preferences.

If the message store described above has to keep track of quarter million users, each of them having 10 messages, then such a system will end up having 2.5 million files to hold the messages, 250,000 to hold the user message directory, and an additional 250,000 holding user preferences. Thus, the total number of files required will be 3 million files. Clearly, most operating systems cannot keep track of such a huge number of files. Hence, such a message store architecture will work well for small scale systems but will fail for systems that have to handle very large number of subscribers. Further, it is very difficult to keep track of three million or more files.

Most of the existing message stores do not accommodate telecommunication applications as well as web applications on the same message store because most of the telecommunication applications are real-time, streaming based applications while the web applications may be streaming or non-streaming because they are less susceptible for time delays.

From the above it is evident that a improved message store is required to handle messages that may be accessed both from the web as well as the telecommunication networks. Further, such a system must be capable of handling a huge subscriber base.

SUMMARY OF THE INVENTION

According to one aspect of the invention, an improved message store server, tuned for both telecommunication networks as well as the Internet/World Wide Web (WWW), supports a huge number of subscribers. In one embodiment, a single message access server (MAS) is able to store a quarter million user records containing user preferences and message directory information along with message pools holding the messages. According to another aspect of the invention, the message access server has its own caching algorithm enabling fast access to user information.

According to further aspect of the invention, if the total number of channels, i.e. simultaneous telephony subscribers, becomes too great for one message access server to handle, the system is easily scaled by adding additional message access servers. Every user has a home message store called the home message access server that maintains the user's message directory, messages, and preferences. The Gateway Access Server (GAS) answers the incoming call, identifies the subscriber to whom the call is destined to based on the caller ID and/or extension, and then contacts the home message access server holding the subscriber information.

According to another aspect of the invention, the unified message store is scalable because additional message file pools may be added to a single MAS and additional MASs may also added. In one embodiment, each subscriber has a home MAS and a user database maintains a correspondence between subscriber number and home MAS so that multiple MASs may be used. Further, each entry in the user's message record includes pool and record pointers to facilitate storage in different pools.

According to another aspect of the invention, messages may be forwarded and shared without creating additional copies of the message. Pointers to the same message are created for different users and a reference count is maintained for the message indicating the number of references to the message.

According to another aspect of the invention, a message forwarding module manages transfers of messages between MASs. In one embodiment, a store and forward queue is maintained so that the forwarding does not require availability of the MAS to which the message is being forwarded.

According to another aspect of the invention, class of service information is maintained in one record. A field in each user profile indicates the class of service to which the user belongs.

A further understanding of the nature and advantages of the invention herein may be realized by reference to the remaining portions of the specification and the attached drawings.

DESCRIPTION OF THE SPECIFIC EMBODIMENTS

Figure 1:
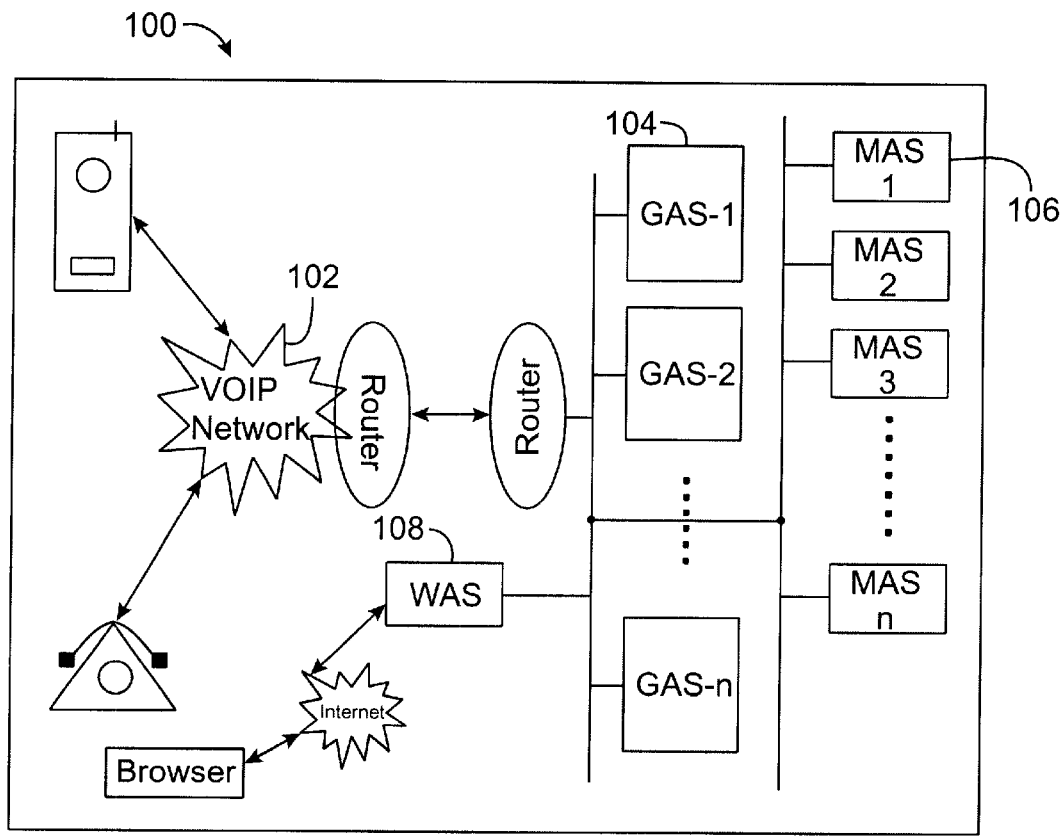
FIG. 1 is a block diagram depicting the architecture of a voice services platform.

FIG. 1 shows a distributed client server system 100, which is used to provide telecommunication application services to callers/subscribers over a managed VOIP network 102 that may be accessed either from the standard phone over the telephone network or from the web using a web browser. A preferred embodiment of the invention is implemented by a MAS 106, i.e. Message Access Server, that is mainly responsible for the intelligent message store. The architecture includes the following systems in one embodiment:

GAS (Gateway Access Server): GAS 104 is the server that runs telecommunication applications. It will interact with MAS 106 for all of the message storage, retrieval and manipulation.

MAS (Message Access Server): MAS 106 is responsible for the message store. Unlike traditional voice mail/application servers where the call flow application logic and message store are on a monolithic system. In this embodiment, the message store is separated from GAS 104, which runs the call flow and application logic. This enables it to provide a very large-scale system where GAS 104 may access any of the message stores based on the user it is currently serving.

WAS (Web Access Server): WAS 108 runs a web server and provides access to subscribers messages like voice, fax, etc.

The art of basic file manipulation and the process of storing message data into files is well known and will not be addressed in detail here. In a preferred embodiment, the intelligent message store will provide access to user preferences and both streaming as well as non-streaming access to user messages. The message store may save voice, fax, email, and other forms of data for the user.

Figure 2:
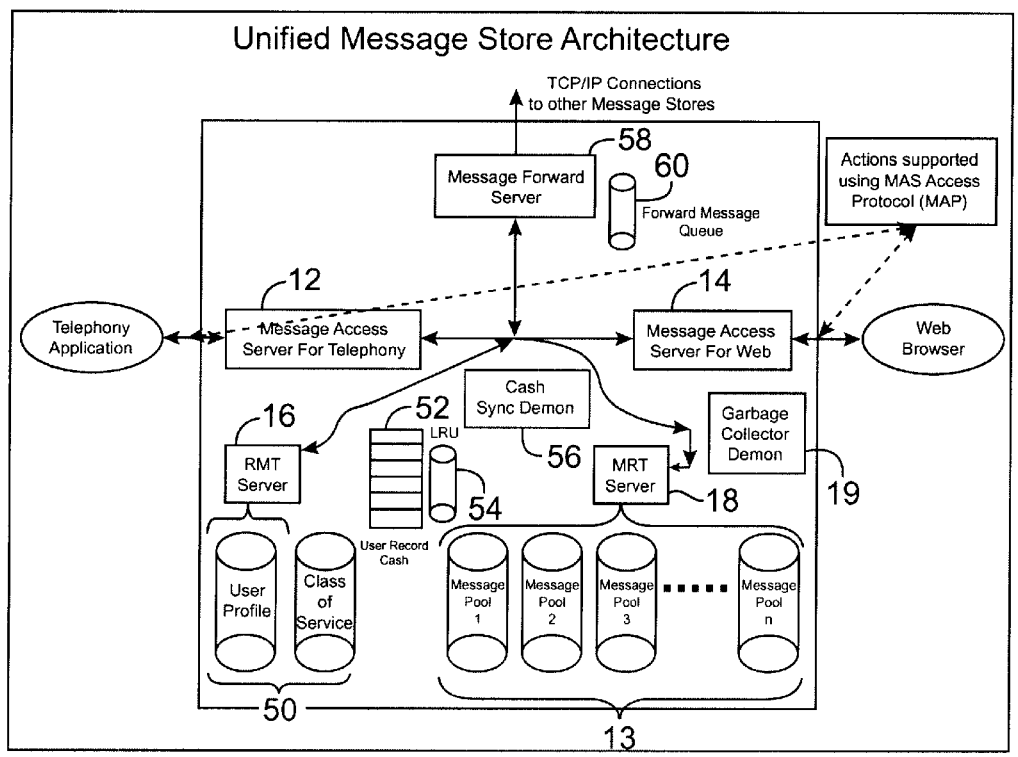
FIG. 2 is a block diagram depicting a preferred embodiment of the invention.

FIG. 2 is an overview of a preferred embodiment of the invention. A Message Access for Telephony (MAST) process 12 responds to telephony application requests and a Message Access Server for Web (MASW) process 14 responds to web browser application requests. Both MAST 12 and MASW 14 may access the services of a record mapping table (RMT) server 16 and a message record table (MRT) server 18. RMT server 16 maps records in a user record file 50. A user record cache 52 and a LRU (least recently used) queue 54 and Cache Synch Demon 56 are also provided. MAST 12 and MASW 14 also have access to a Message Forward Server 58, which utilizes a Forward Message Queue 60.

Figure 3:
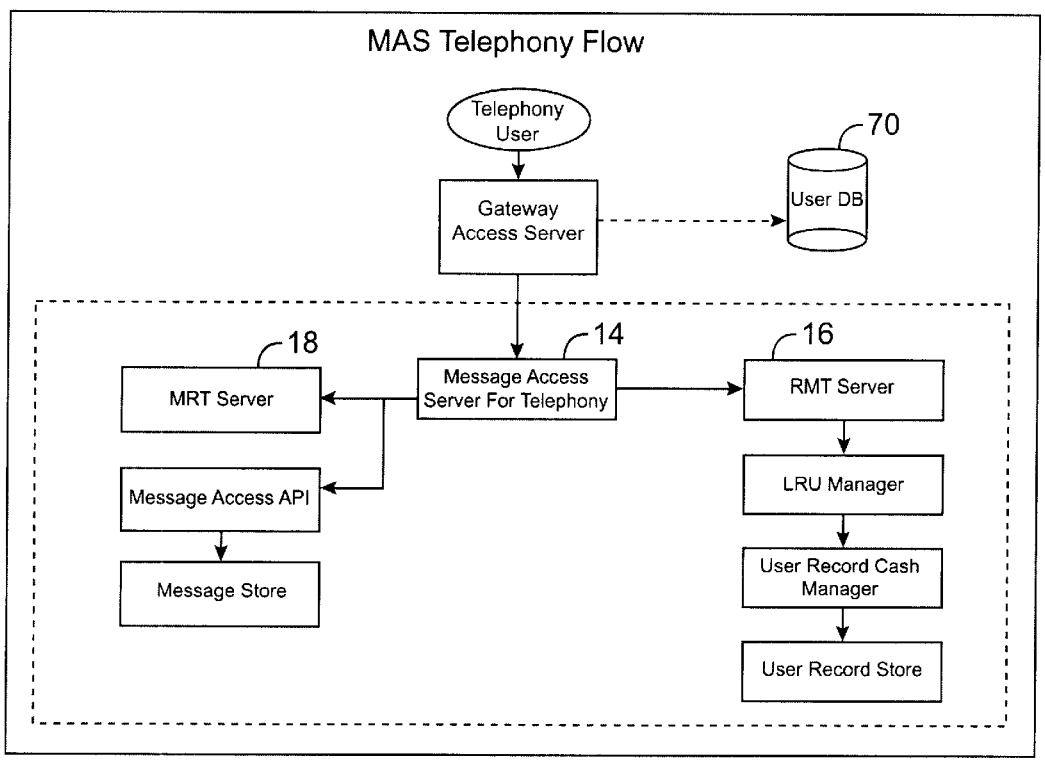
FIG. 3 is a block diagram depicting MAS telephony flow.
Figure 4:
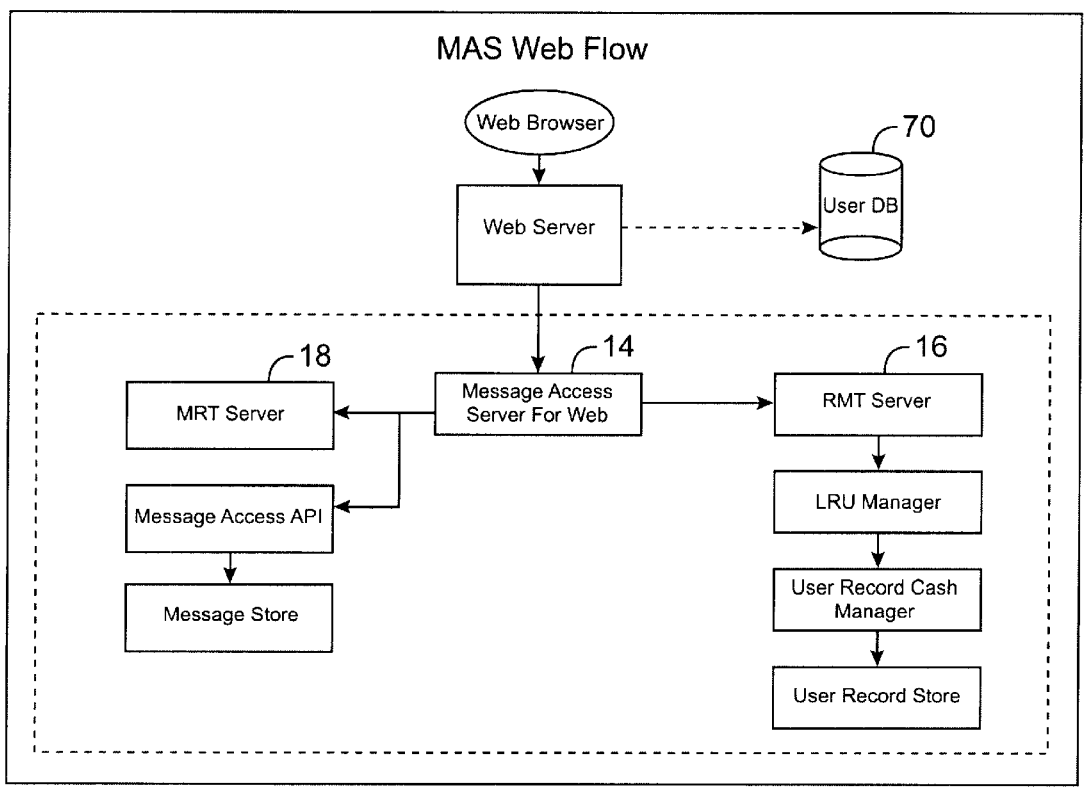
FIG. 4 is a block diagram depicting MAS web flow.

FIGS. 3 and 4 are more detailed block diagrams depicting MAS telephony flow and MAS web flow respectively. In FIGS. 3 and 4 a user database 70 is depicted. As will be described further below, the system is easily scaled by adding more message servers. User database 70 includes records for each subscriber indicating the message store holding information for that subscriber. The inclusion of both MAST 12 and MASW 14 in the architecture optimizes access for both internet telephony application and web browsers.

MAST 12 implements streaming access to voice data, which is required to reproduce comprehensible voice messages. Web applications generally do not require streaming messages and are more efficiently serviced using an atomic data protocol that is implemented by MASW 14.

Before describing the operation of the modules depicted in FIG. 2, the structure of the message record file and message record pool will be described with reference to FIGS. 5–7.

Figure 5:
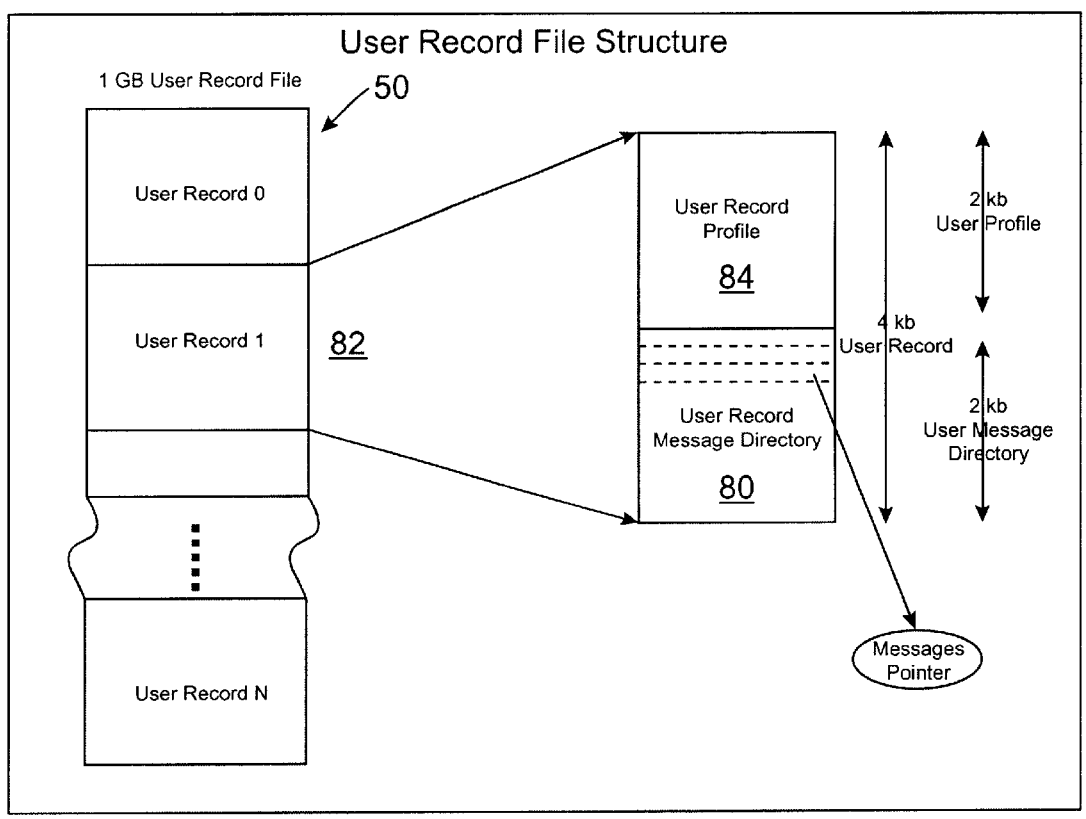
FIG. 5 is a block diagram depicting a User Record file structure.

As depicted in FIG. 5, a preferred embodiment has a single large record file 50 that is split into multiple 4 Kb user record blocks 82. Each of the user record blocks 82 contains a user profile section 84 that stores user preferences and a message directory section 86 that contains a listing of all of the user message directory information. Multiples of these records may be linked to serve users who hold large number of messages. In one embodiment, the first record in the user record file is designated IRN-1, the next record is designated IRN-2, and the Nth user record is designated IRN-N, where IRN stands for Internal Reference Number.

In order to get to the specific user record, the application multiplies the IRN with the size of the user record and then performs a seek operation to get to the desired record. This method of accessing user information provides speed and enables a large number of subscribers to be serviced simultaneously. Because all the operations are performed using IRNs rather than the subscriber number, a separate dedicated UDP server process called "RMT server" (described below) is maintained to provide lookup service given the subscriber number in one embodiment.

The embodiment has a single large file that is used to maintain class of service (COS) information. Each of the class of service is a fixed size record in this file. The class of service is used to group users together. For example all of the free subscribers in the system may be given a specific class of service while the paid subscribers may be given a separate class of service. Further the class of service enables tiered pricing by having separate classes of services for the users. Using the class of service, it is possible to set user preferences like maximum number of messages they may have, maximum number of fax pages they may receive, maximum length of a voice message, etc. The user profile for each user has a class of service field indicating the class of service to which the user belongs.

Figure 6:
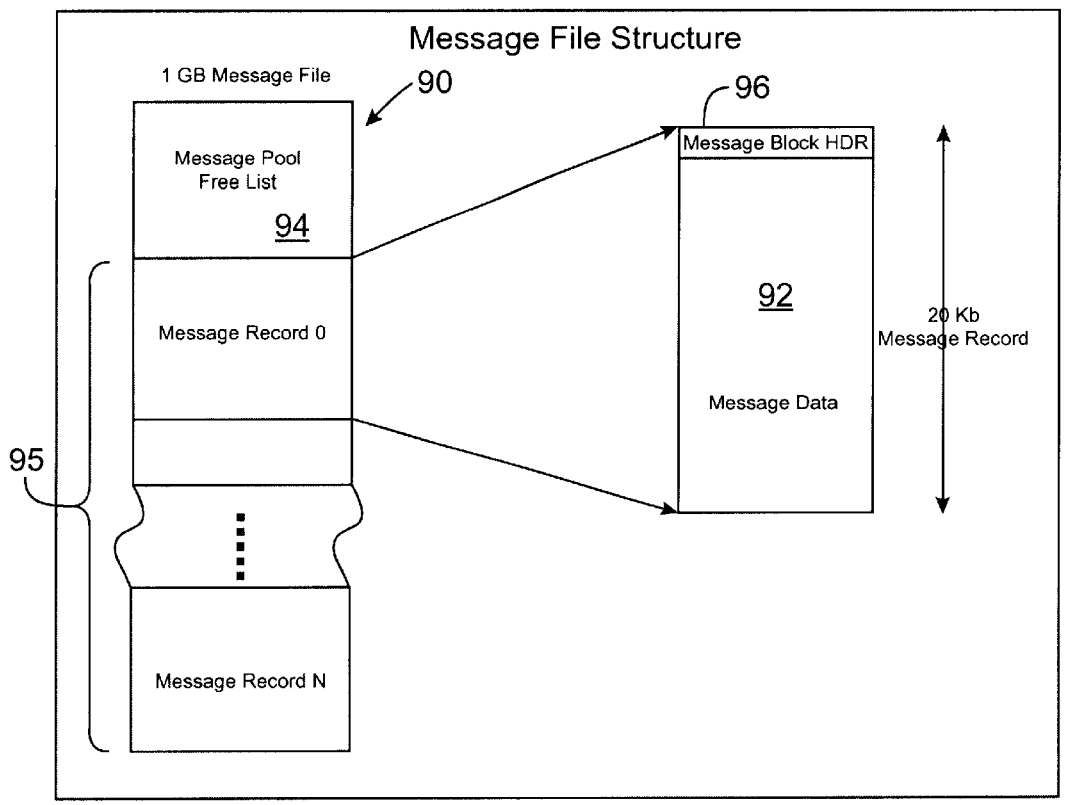
FIGS. 6 and 7 are block diagrams depicting a Message Record file structure.
Figure 7:
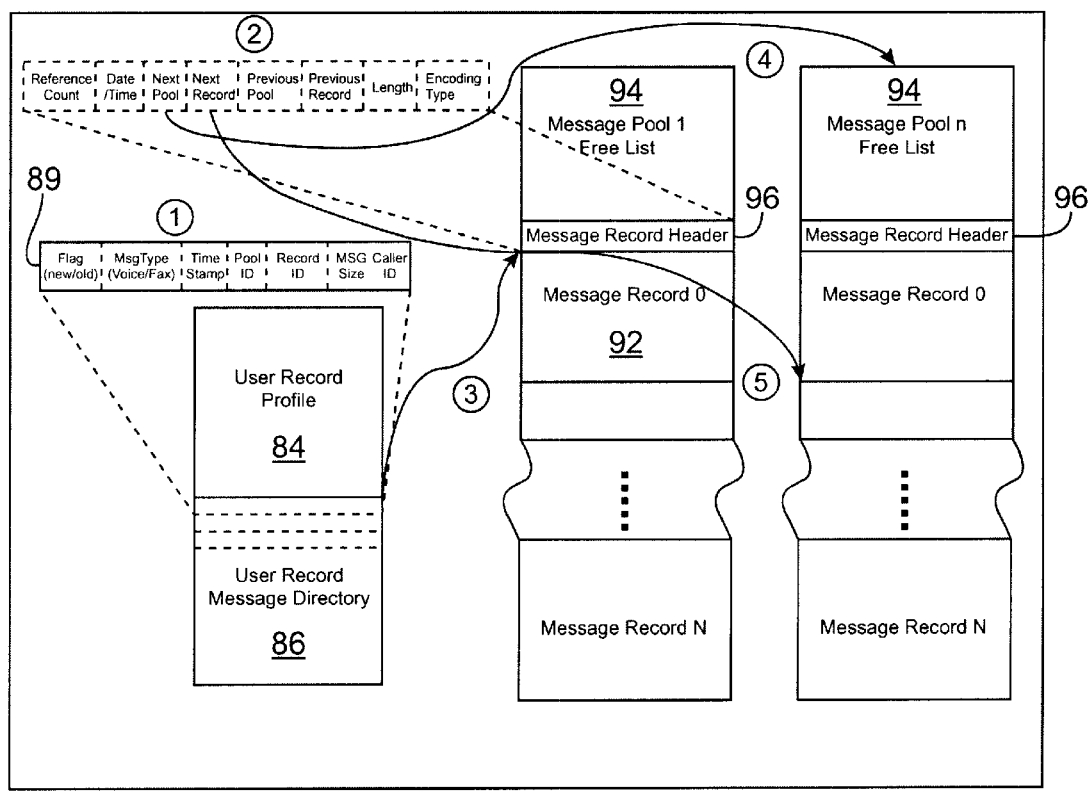

The structure of the message pool is depicted in FIGS. 6 and 7. As depicted in FIG. 6, the system has several large files 90 that are split into fixed size blocks 92. One embodiment has 256 message files called message pools. Each message pool may be 1 Gb or 2 Gb each. Each of the message pool files has a free list 94 at the beginning of the file that indicates which of message records 95 are free and which are under use. Each of the message pools in turn has fixed size message records 92 with a fixed size header 96 at the beginning. Using message record header 96, several of these records may be linked together to store a message.

FIG. 7 depicts in detail the layout of the message directory entries and message record header entries according to one embodiment. FIG. 7 also depicts how a message is linked from the user's message directory 86 to a first message record 96 in message pool 13 and to subsequent records and how several message records from the same or different message pools are linked together to create virtual concatenated message storage space for the message according to one embodiment. A message directory entry 89 includes a Flag (New/Old), Msg Type (Voice/Fax), Time Stamp, Pool ID, Record ID, Msg Site, and Caller ID. The Pool ID points to message pool 13 in which a message is stored and a record ID points to the record in the pool. Message record header 96 includes reference count, date/time, next pool, next record, previous pool, previous record, length, and encoding type sections. The Next Pool and Next Record fields link multiple message records together. The Reference Count field, as will be described more fully below, allows the same message to be shared by multiple users.

Referring to FIG. 7, message directory entry 89 is shown in detail at "1". The Pool ID and Record ID fields point ("3") to a message record 92 at a designated point in a designated pool. Message Record header 96 is shown in detail at "2". If a message is too long to be stored in one message record block 92 then the Next Pool field points ("4") to the pool in which the next part of the message is stored and the Next Record field points ("5") to the record in the pool. A message of any length may be stored through linking of message blocks.

Returning now to FIG. 2, the external telephony and web applications will access services of the MAS 106 (Message Access Server) using a TCP/IP protocol called MAP (MAS Access Protocol) in one embodiment. The embodiment discussed in this section contains the following modules. Each of the modules discussed below is a process running on MAS 106. MAST (Message Access Server For Telephony):

MAST 12 is a process that is started when message access server 106 comes into service. It is responsible for providing message access services to applications that require streaming access to message data. This process, after starting, will spawn several worker threads. Each worker thread may handle one streaming request for message store access. The MAST process will then wait on a TCP/IP socket for external applications that require streaming data services from the message store to connect to it.

An external application like the telephony application that requires streaming access to message data will connect to this server. MAST server 12 will accept the connection and assign a worker thread to process any further requests. The external application and the worker thread in MAST 12 will exchange data using MAP (MAS Access Protocol), more fully described below, over the TCP/IP connection.

MAST 12 maintains all internal references to users using an index called an internal record number (IRN). The external application is completely ignorant of the existence of the IRN. MAS 106 has a server process called RMTD (Record Mapping Table Demon) that provides mapping services between subscribers mailbox number and the internal record numbers. The IRN enables MAS 106 to have fast, rapid, and random access to any subscriber information.

When MAS 106 first receives the request from the application for message data access for a particular subscriber, MAST 12 will contact RMTD using UDP/IP and request IRN for the subscriber's user record. RMTD will retrieve the IRN given the subscriber number from its mapping table. It will then provide this information back to the MAST's worker thread, which will cache the mapping information for subsequent requests. When the subscriber exits the application, the system will close the connection. This action causes the MAST worker thread to close its connection and go back and join the worker thread pool and wait for the next work assignment.

MASW (Message Access Server For Web):

MASW 14 is a server process that responds to non-streaming requests to the message store. When a web based application intends to access and/or manipulate a subscriber's message it will send the request to MASW 14 over TCP/IP. All the requests that come to MASW 14 are treated as atomic transactions and do not have inter-dependencies.

MFS (Message Forward Server):

In a preferred embodiment, a given subscriber has all its messages in single MAS 106 called the home message store. A single MAS 106 is scalable because additional message pools 13 may be added. Additionally, the entire system is scalable because additional MASs 106 may be added. As depicted in FIGS. 3 and 4, user DB 80 stores a correspondence between subscribers and MASs 106. MFS 58 makes it possible to send messages from one MAS 106 to another.

When a subscriber sends a message to another subscriber in a different message store it is possible that the destination message store may not be available to accept the message at that instant. In view of this, all messages that are sent to a different message store are always sent to Message Forward Server 58.

Message Forward server 58 is a process that provides store and forward service to all the subscribers on given MAS 106. All the messages that are destined to different NASs 106 are queued by the message forward server for subsequent delivery.

Cache Sync Demon:

Cache sync demon 56 is a process that periodically flushes all dirty pages in the user record cache to the disk. MAS 106 maintains internal cache of all user records that are being accessed. Every time a new user accesses MAS 106 the subscriber's user record is brought into a shared memory cache. The cache is maintained using least recently used mechanism.

Cache sync demon 56 makes sure that a dirty user record is flushed to disk and synchronizes the data on disk with the latest changes made in memory. This ensures that in the event of a catastrophic system crash, the data on disk is always at a known state. For example, if a user stores a new message then a new message pointer is added to the user record stored in the cache. However, the user record on disk does not contain the new message pointer so that at this point in time, the user record in the cache is different from the user record on the disk and the two records are not synchronized. A user record in the cache that has been modified since having been read from disk is termed "dirty". Records in the cache may include a "dirty bit" that is set when the record is changed and cleared when the record is flushed to disk. The cache sync demon 56 periodically replaces unsynchronized records on disk by overwriting them with dirty records stored in the cache to synchronize the cache and disk.

RMT Server:

RMT Server 16 is a UDP server process that provides mapping of subscriber number to internal user record numbers (IRN). When the system is started for the first time, RMT Server 16 will read the user record file to create a mapping between the subscriber number and the user record number. Various other sub-systems like MAST 12 and MASW 14 contact RMT server 16 over UDP/IP to request its services.

MRT Server:

MRT server 18 is a process that manages the free list for each of the message pools 13. MAS 106 has several 1 Gb message files 90 that hold the messages. Each of these files has a free list 94 at the very beginning of the file that indicates which of the message records in that file have been used. MRT server 18 is responsible for managing message pool free list 94.

When MRT server 18 starts it will open all of the message pools 13 and will read the free list information into memory. It will then wait on a UDP port. When MAS 106 receives a new message it will request MRT server 18 for a message record, in which case MRT server 18 will find the next available free message record and allocate it. Similarly when a message is deleted, MRT server 18 will receive a request for a particular message record to be freed, MRT server 18 will update the corresponding message pool's free list to indicate that the message record is available.

Garbage Collector Demon:

MAS 106 has a process called a garbage collector demon 19 that runs periodically to make sure that all of the message pools are consistent. It will perform following tasks in one embodiment:

1. Expiring subscriber messages in the user record if they are stored for a duration that is greater than permitted by the class of service.
2. Assuring that all messages are properly stored and all the message records are properly linked for the message.
3. Assuring that ownership of messages and the message pointers in the user record are valid and correct.

The garbage collector is responsible for assuring that the system is functioning properly and detecting any problems in the message store before these problems start affecting entire system.

Intelligent Message Management:

As described above with reference to FIG. 7, each message record includes a Reference Count field. When a new message is left for a subscriber, the message reference count on each of the message records storing the message will be set to one. Thus, when a message is created its reference count is one.

Now, if a first subscriber having this message wants to forward the message to a second subscriber, then the first subscriber typically adds an introduction to the message to be forwarded. This introduction will have a reference number of one. A pointer to the message will be added to the user record of the second subscriber and the reference count in the message header will be incremented. If it is assumed that the value record count of the message was previously "1", then the new value will be "2". Since a pointer to the message is present in the user records of both the first and second subscribers, both subscribers may access the record. However, there is still only one copy of the message. This intelligence enables efficient use of message storage when used for messaging between club member's, etc.

If the first subscriber deletes the message, the entry in the first subscriber's message directory that points to the message is deleted. The message record reference count number in the message record header is decremented, in this example to "1". This indicates that the message still has a pointer in the second subscriber's user record and the storage space for the message should not yet be returned to the pool. If the second subscriber also deletes the message then the reference count will be decreased to "0", indicating that the message record is freed and a request is sent to MRT server 18 so that the record gets added to the free list.

Using the intelligent message management, MAS 106 enables very efficient use of storage and scales to accommodate large user groups like clubs, discussion groups and chat groups, etc.

Often subscribers do not bother to delete messages and much of the pool will be taken up by stale messages. As described above, garbage collector demon 19 periodically deletes stale message to free up storage space in the pool.

Figure 8A:
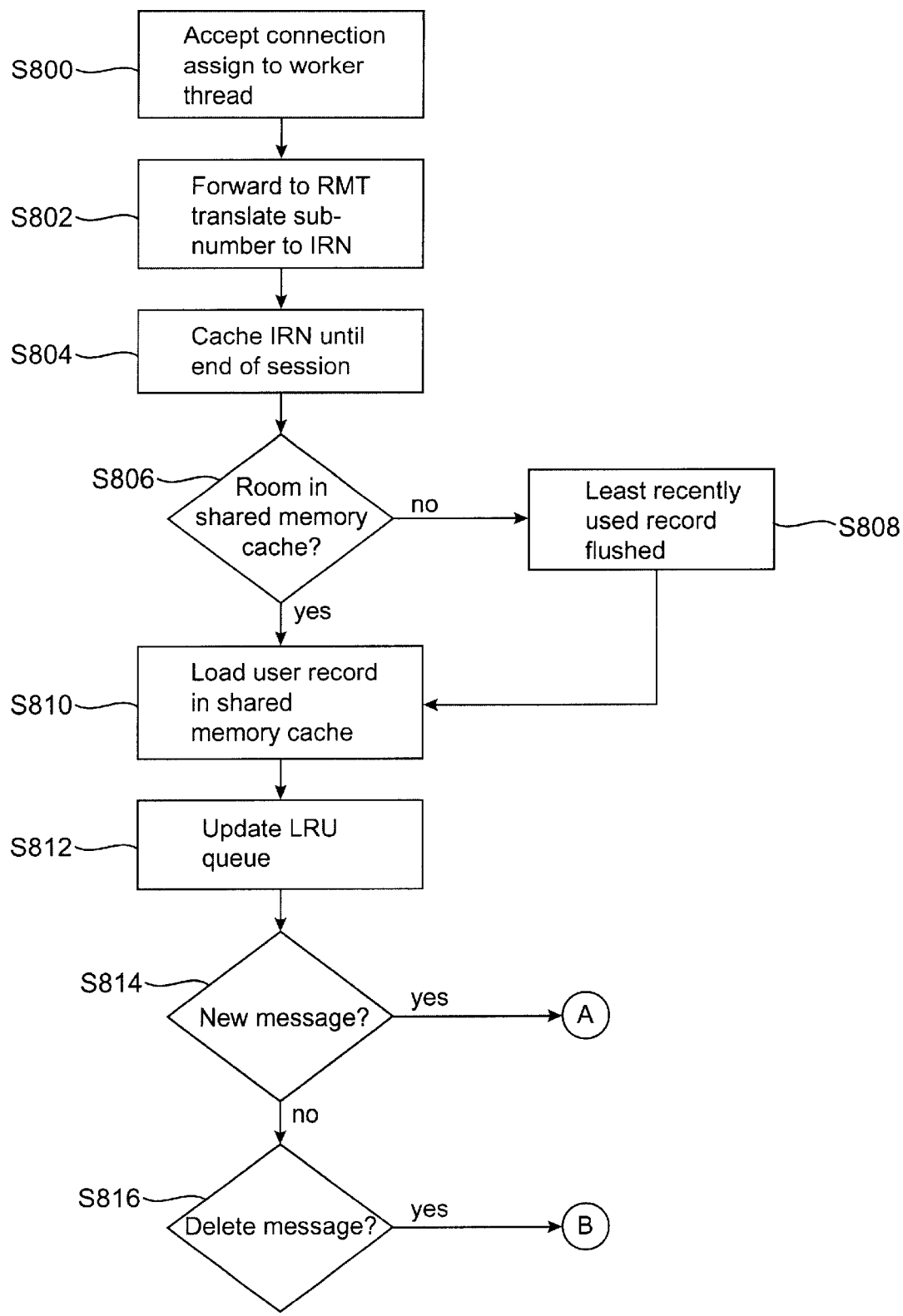
FIG. 8 is a flow chart depicting a series of acts performed by a preferred embodiment.

Operation:

As shown in FIG. 8A, In one of the embodiment, when a streaming application requests the services of the message store, it will connect to MAST 12 using TCP/IP. Then, in step S800, MAST 12 will accept the connection and assign the work to one of its worker threads. From this point the external application may send its requests directly to the worker thread using TCP/IP. The very first message the application sends to the thread is the subscriber number. In step S802, the thread will forward the subscriber number to RMT server 16 which will translate it to internal record number (IRN).

From this point on, the worker thread will cache IRN till the end of session (step S804). If there is no room in the cache, then the least recently used record in the cache maintained by LRU queue 54 is taken and flushed back to the disk (steps S806 and S808). The user record is then loaded into the shared memory cache and LRU (Least Recently Used) queue 54 is updated (step S810 and S812).

Shared memory cache loads and retains the user record into a specific location in memory. The caching system also has a LRU (least recently used) queue 54 that will maintain a list of least recently used user records.

Figure 8B:
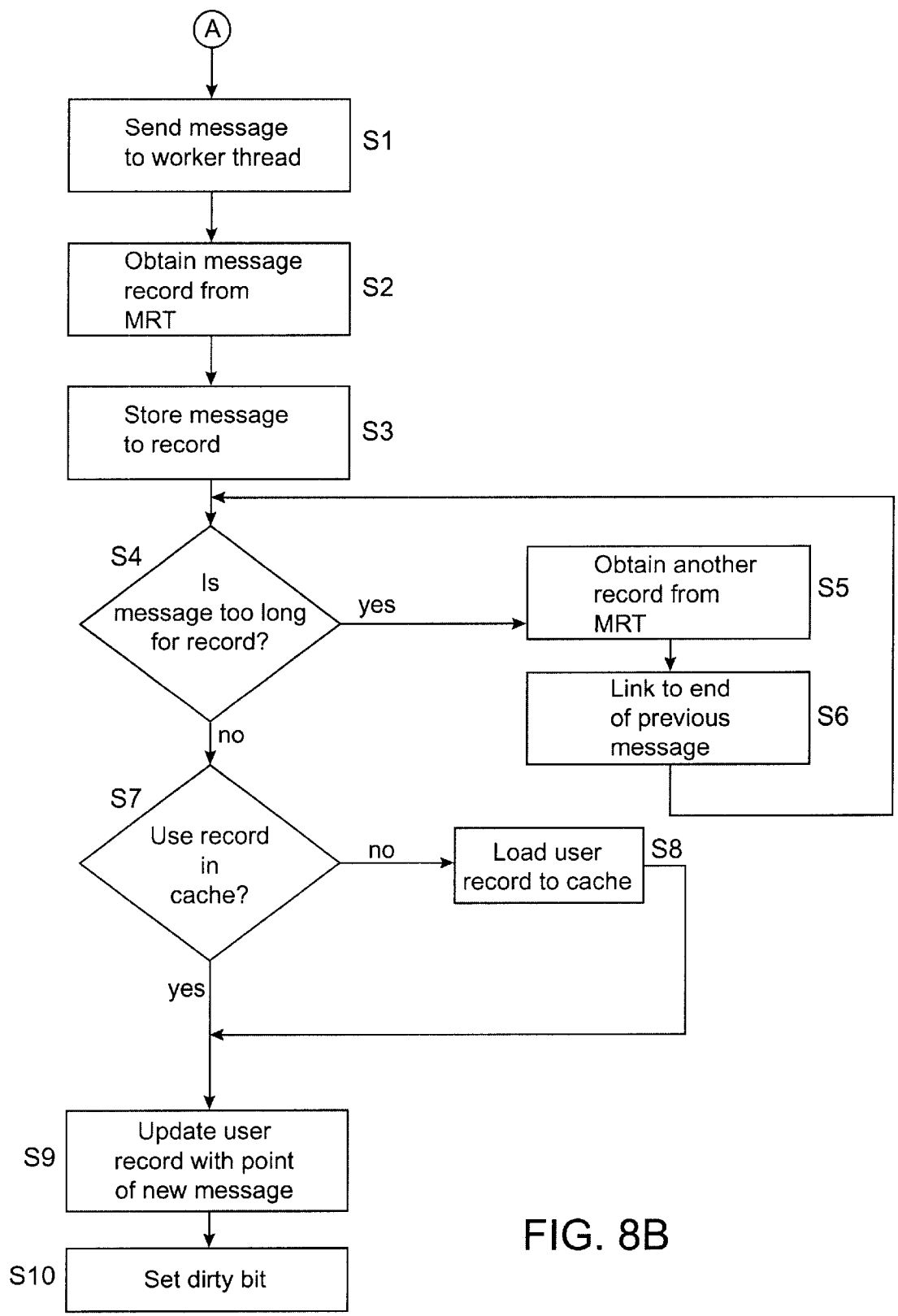

In step S814, if the subscriber requested a new message, the process proceeds to A of FIG. 8B. In step S816, if the subscriber deleted a message, the process proceeds to B of FIG. 8C.

An example according to one embodiment of the operation of the system will now be described with reference to the flowchart of FIG. 8B. If the subscriber requests to record a new message, the application will take the message data and send it to the worker thread (step S1). In step S2, the worker thread will contact the MRT server and obtain a message record. In step S3, the message is stored into this record.

If the message data is larger than a single message record then it will obtain another message record from the MRT server (steps S4 and S5) and link the end of first message record to point to the next message record (Step S6). This process continues until entire message is stored. At this point the worker thread will load the user record into the cache if it is not already in the cache (steps S7 and S8). In step S9, the message directory part of the user record is updated to include the new message. Also, the dirty bit in the user record cache is set in step S10. This bit is used by the cache sync demon to write all modified user records to disk.

Figure 8C:
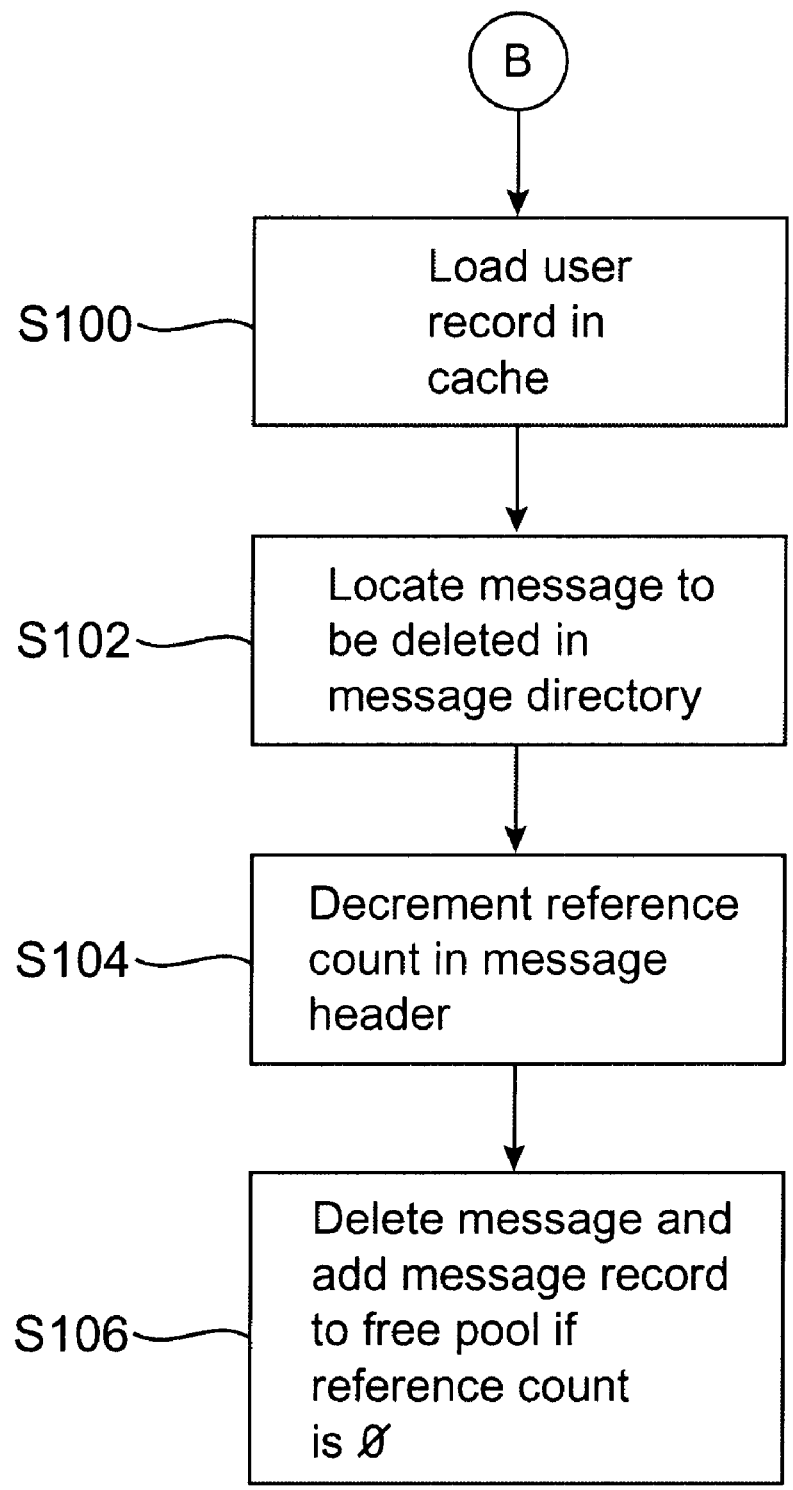

FIG. 8C illustrates an event when the subscriber deletes a message. In step S100, the worker thread loads the user record into the cache if it is not already in the cache and update the LRU accordingly. It will then locate the message that needs to be deleted in the message directory (step S102) and will go through the message pool and decrement the reference use count for that entry (step S104). In step S106, if the count reaches zero, the entry is deleted by requesting the MRT server to add the record back to the free list.

Figure 9:
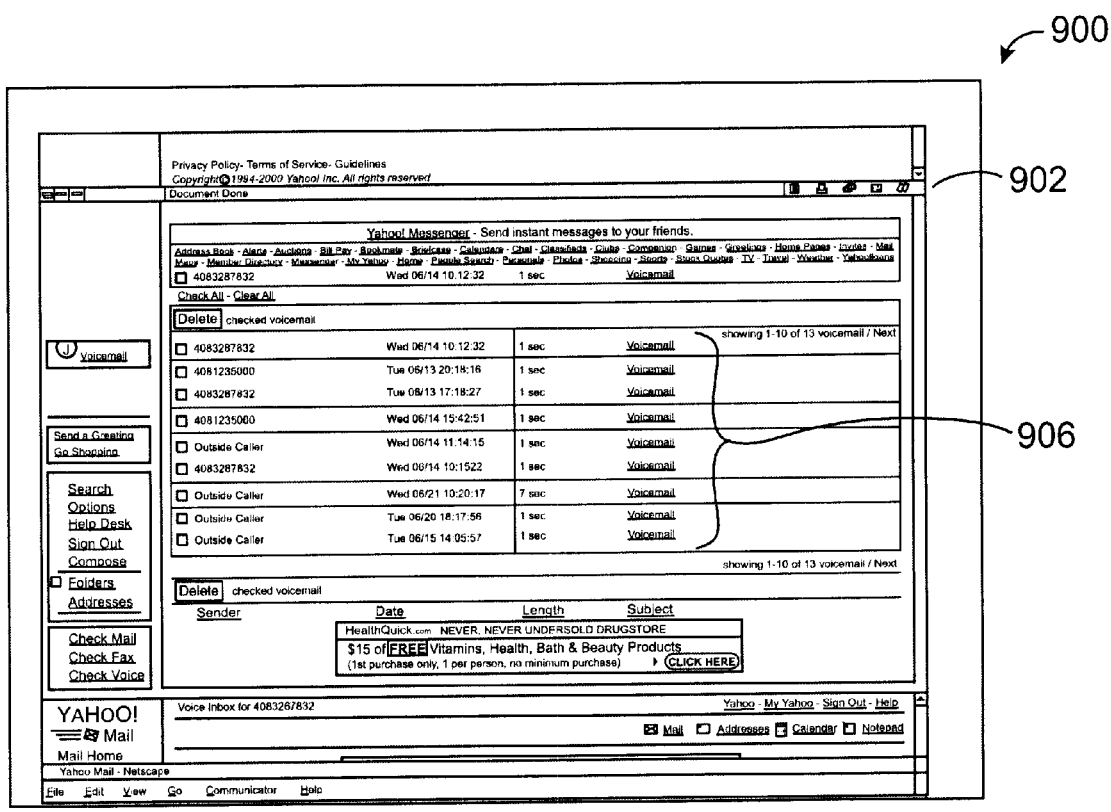
FIGS. 9 and 10 are screen shots of pages used to interface with a web-based application.
Figure 10:
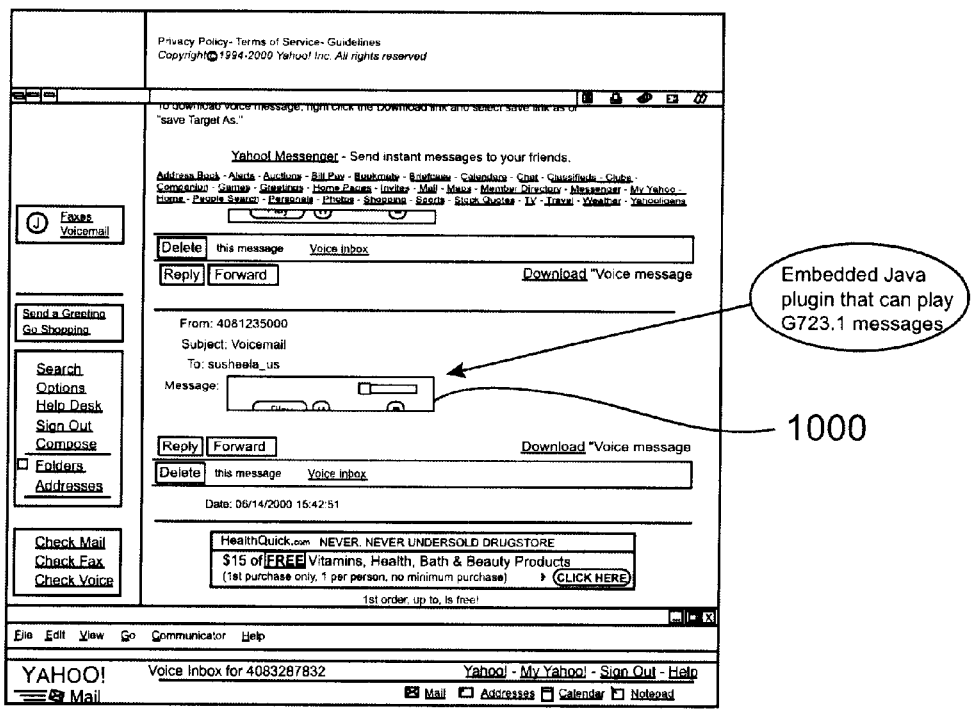

FIGS. 9 and 10 depicts screen shots viewed by web-based applications depicting the contents of a subscriber's message directory and a voice access interface. In FIG. 9, browser 900 displays a web page 902 listing voice mail messages 906 received by the service requester. In FIG. 10, a signed plug-in Java applet displays controls 1000 for listening the voicemail messages stored in the native VoIP format.

The invention has now been described with reference to the preferred embodiment, alternatives and substitutions will now be apparent to persons of skill in the art. Accordingly, it is not intended to limit the invention except as provided by the appended claims.

What is claimed is:

1. A scalable message store comprising:
   a telephony access server that receives a user request for a message, with the user identified by a user number, and provides streaming access to message data of the message;
   a web access server that receives a user request for the message, with the user identified by the user number, and provides non-streaming access to message data of the message;
   a message file that stores message data, with the message file including a plurality of message records, each message record including a message block header and message data;
   a user record file including a plurality of user records, each record including a user profile section and a message directory section;
   a record mapping table, accessed by either the telephony or web access server to obtain an index to a user record based on the user number;
   with the telephony access server or web access server utilizing the index to access the user record for the user and accessing the message directory for that user to obtain a pointer to a message record having message data requested in the user request to either the telephony access server or web access server, wherein the message block header of the obtained message record includes a pointer to another message record including additional message data of the requested message if the message data of the requested message spans additional message records.

2. The message store of claim 1 further comprising:

a cache for a user record accessed for a current user; and a least recently used queue for flushing stale records from the cache.

3. The message store of claim 2 further comprising:

a class of service file, including a plurality of class of service records, each holding the definition of a class of service;

and with the profile section of the user record holding a field indicating a class of service record associated with the user.

4. A scalable message store comprising:

a telephony access server that receives a user request, with the user identified by a user number, and provides streaming access to message data;

a web access server that receives a user request, with the user identified by the user number, and provides non-streaming access to message data;

a message file that stores message data, with the message file including a plurality of message records, each message record including a message block header and message data;

user record file including a plurality of user records, each record including a user profile section and a message directory section;

a record mapping table, accessed by either the telephony or web access server to obtain an index to a user record based on the user number;

with the telephony access server or web access server utilizing the index to access the user record for the user and accessing the message directory to obtain a pointer to a message record having message data requested by the user; and a message record header having a reference count field indicating the number of references to message record.

5. A scalable message store comprising:

a plurality of message access servers, each message access server including:

a telephony access server that receives a user request for a message, with the user identified by a user number, and provides streaming access to message data of the message;

a web access server that receives a user request for the message, with the user identified by the user number, and provides non-streaming access to message data of the message;

an expandable set of message files that stores message data, with a message file including a plurality of message records, each message record including a message block header and message data;

a user record file including a plurality of user records, each record including a user profile section and a message directory section;

a record mapping table, accessed by either the telephony or web access server to obtain an index to a user record based on the user number, with the telephony access server or web access server utilizing the index to access the user record for the user and accessing the message directory to obtain a pointer to a message record having message data requested in the user request to either the telephony access server or web access server, wherein the message block header of the obtained message record includes a pointer to another message record including additional message data of the requested message if the message data of the requested message spans additional message records; and a message forwarding module having a message forward and store queue that holds messages to be forwarded and forwards messages to other message access servers when the other message access server is ready to receive messages; and a user database having records associating each user with a single home message access server.

6. A method for storing messages, the method comprising:

storing message data in a plurality of message records, wherein a message record comprises a message header;

storing user records, including message directory information, in a user record file;

in response to a user request:

mapping the user to a user record in the user record file based on a user number;

accessing the user record;

providing the user information identifying messages having entries in the message directory;

in response to the user selecting a message, using the entry in the message directory to access a message record including message data for the message requested in the user request, wherein a message header of the obtained message record includes a pointer to another message record including additional message data of the requested message if the message data of the requested message spans additional message records;

providing streaming access to the message data to telephony applications in response to the user request; and providing non-streaming access to web applications in response to the user request.

7. The method of claim 6 further comprising the acts of:

caching an accessed user record; and flushing least recently used records from the cache when space is required to store a new record.

8. The method of claim 7 further comprising the acts of:

marking a user record in the cache as dirty when the user record is modified; and periodically flushing dirty records to memory to maintain coherence between the cache and memory.

9. The method of claim 6 further comprising the steps of:

incrementing a reference count in the message record header if the message is shared by another user; and decrementing the reference count if a user sharing the message record deletes the message.

10. The method of claim 6 further comprising:

adding new message record files when extra message records are required to service additional users.

* * * * *